United States Patent [19]

Dierkes et al.

[11] Patent Number: 4,739,425

[45] Date of Patent: Apr. 19, 1988

[54] MAGNETIC DISK MEMORY COMPRISING A MEMBRANE SPRING-BRACED BEARING OF A DISK PACK WHICH IS ROTATABLY MOUNTED AT BOTH ENDS

[75] Inventors: Albert Dierkes, Planegg; Johann Biermeier, Munich; Wilhelm Brand, Rosenheim; Otto Olbrich, Taufkirchen, all of Fed. Rep. of Germany

[73] Assignee: Siemens Aktiengesellschaft, Berlin and Munich, Fed. Rep. of Germany

[21] Appl. No.: 168,068

[22] Filed: Jan. 29, 1985

[30] Foreign Application Priority Data

Feb. 7, 1984 [DE] Fed. Rep. of Germany ....... 3404196

[51] Int. Cl.⁴ .......................... G11B 5/012; G11B 5/82
[52] U.S. Cl. .......................... 360/97; 360/98
[58] Field of Search .......................... 360/97, 98, 99; 369/270

[56] References Cited

U.S. PATENT DOCUMENTS

| | | | |
|---|---|---|---|
| 3,670,315 | 6/1972 | Fowler | 360/97 |
| 4,005,490 | 1/1977 | Duncan et al. | 360/97 |
| 4,216,512 | 8/1980 | Vidwans | 360/97 |
| 4,519,010 | 5/1985 | Elsaesser et al. | 360/98 |

FOREIGN PATENT DOCUMENTS 0166118 1/1986 European Pat. Off. .......... 360/98

OTHER PUBLICATIONS

Apr., 1982, pp. 163–169.

Primary Examiner—Robert S. Tupper
Assistant Examiner—Melissa J. Koval
Attorney, Agent, or Firm—Hill, Van Santen, Steadman & Simpson

[57] ABSTRACT

A magnetic disk memory comprises a hub rotatably seated at both ends in a one-piece supporting shell of a housing and carrying at least one storage disk and driven by an internal drive motor. The hub is fixed on a rotating spindle, whereby a pair of ball bearings is provided for seating the spindle at mutually opposite walls of the supporting shell. The ball bearings are embraced in the axial direction in order to achieve a play-free spindle guidance. Each ball bearing has an inner ring fixed with an interference fit onto a respective end of the spindle and a respective bearing bushing likewise seated with an interference fit on its outer ring. One of the two bearing bushings is rigidly disposed in the allocated wall of the supporting shell and, in the incorporated condition of the hub, the other bearing bushing is fixed at the opposite wall of the supporting shell and is prestressed in the axial direction.

23 Claims, 3 Drawing Sheets

FIG 1

FIG 3

MAGNETIC DISK MEMORY COMPRISING A MEMBRANE SPRING-BRACED BEARING OF A DISK PACK WHICH IS ROTATABLY MOUNTED AT BOTH ENDS

CROSS REFERENCE TO RELATED APPLICATIONS

This application is related to the following applications
Ser. No. 696,203, filed Jan. 29, 1985,
Ser. No. 696,202, filed Jan. 29, 1985,
Ser. No. 696,184, filed Jan. 29, 1985,
Ser. No. 696,205, filed Jan. 29, 1985, and
Ser. No. 696,204, filed Jan. 29, 1985.

BACKGROUND OF THE INVENTION

1. Field of the Invention

The present invention relates to a magnetic disk memory which comprises a hub rotatably mounted at both ends in a one-piece supporting shell of a housing, carrying at least one storage disk and driven by a drive motor, the hub being fixed on a rotating spindle, whereby a pair of ball bearings is provided for rotatably seating the spindle at mutually opposite walls of the supporting shell, the ball bearings being braced in the axial direction in order to achieve a play-free spindle guidance.

2. Description of the Prior Art

A distinction is generally made in magnetic disk memories between memories having fixed disk packs and exchangeable disk packs. Technical develpment is continuing to proceed in the direction of higher and higher storage capacities both in view of the track density and bit density as the characteristic for the storage capacity per disk face, on the one hand, and in view of the mechanical structure in order to be able to accommodate as many magnetic disks as possible in a prescribed mounting space. As an example of this is the so-called 5¼" inch fixed disk memory whose magnetic disk have an outer diameter of 130 mm and an inner diameter of 40 mm according to the German industrial standard. Analogous to the dimensions of the competing floppy disk drives, a mounting space having a mounting height of 82.5 mm and a base area of 146mm×203 mm has crystallized for this type of memory as a uniform size which is available for the overall apparatus including the housing and the appertaining electronics.

The desire to accommodate as many magnetic disks as possible in this prescribed mounting space is subordinate to the developmental goal of higher storage capacities and to the efforts to increase the recording density on the magnetic disks themselves. Within the scope of this structural endeavor, embodiments of the 5¼" fixed disk memories have been disclosed in which the drive motor for the disk pack has been miniaturized to such a degree and has been structurally designed such that it can still be built into the hub of the disk pack, even given a prescribed inner diameter of 40 mm for the disk packs. An element which has a significant co-determining effect on the overall height of conventional fixed disk memories is therefore integrated in the hub of the magnetic disk pack and the overall height exploitable for the disk pack is thus expanded. Based on current conditions in the size of the combined magnetic heads and of the disk thickness, disk packs which contain up to eight magnetic disks stacked on top of one another have thus become possible. The remaining overall height is required for the housing and for the device electronics.

As mentioned above, the recording density on the magnetic disk is the product of the write density times the track density. A significant criterion for the structaral format of the magnetic disk memory also derives for the case of the present invention specifically from track density having, for example, more than 1000 tracks per inch. This high track density requires a best possible vibration-free seating of the spindle of the disk pack in the housing. Requirements are therefore made for this type of memory such as heretofore played a part only with large disk memories, for example the 14" disk memories.

With respect to conventional large disk memories, it is generally known to seat the spindle of the disk pack at one end in a heavy base plate, employing highly sophisticated structures, this particularly applying to interchangeable disk memories in disk memories designed to utilize replaceable disk packs. Structures are also known in which the spindle is mounted at both ends in a rigid housing surrounding the disk pack. In order to achieve as vibration-free a spindle seating as possible, a fixed bearing and a movable bearing are employed with this two-sided seating and a spring is provided adjacent the movable bearing, the spring tensing the two bearings relative to one another after assembly such that a coaxial spindle guidance that is as free of play as possible is achieved. In practice, this goal, however, can only be achieved to a limited extent. Furthermore, additional mounting space is required for the incorporation of the spring, this therefore being lost as useable storage space.

SUMMARY OF THE INVENTION

A main object of the present invention, therefore, is to provide a magnetic disk memory having a two-sided mounting of the hub in the housing which is designed in a space-saving fashion, which produces a play-free fastening of the ball bearings despite admissible mechanical tolerances in the bearing structure and which achieves the desired coaxialism of the ball bearings without adjustments. The structure is thereby to be designed such that the disk pack, including the bearings, can be mounted as a module, i.e. can be inserted into the housing as a finished unit.

The above object is achieved, according to the present invention in a magnetic disk memory of the type initially mentioned which is specifically characterized in that each ball bearing which is fixed with an interference fit to the spindle by its inner ring, has a respective bearing bushing associated therewith, the bearing bushing likewise being seated with interference fit on the outer ring of the ball bearing; in that one of the two bearing bushings is rigidly disposed in the allocated wall of the supporting shell; and that the other bearing bushing is resiliently fixed at the opposite wall of the supporting shell, being prestressed in the axial direction in the assembled condition of the hub. This solution is particularly distinguished in that an unequivocally play-free spindle bearing is achieved with the assistance of two fixed bearings instead of the conventional combination of a movable bearing and a fixed bearing, so that the play that is always unavoidable when utilizing a movable bearing is eliminated. At both ball bearings, the inner ring and the outer ring press with an interference fit against the spindle or, respectively, the associated bearing bushing. In contrast to conventional solutions, it is not a coil spring that is employed as the bracing element, but rather a space-saving membrane spring is utilized and the part of the mounting space thereby acquired can be added to the space useable for the disk pack.

Since the two bearing locations are disposed in opposite walls of a one-piece supporting shell of the housing, the bearing locations together with the appertaining fitting surfaces can be manufactured in one chucking operation, this being of considerable significance for achieving the goal of coaxialism of the spindle bearings. It is particularly advantageous in this context to design the membrane spring as a flat disk whose edge is screwed to the end face of the second bearing bushing facing the housing and which comprises a centrally-disposed supporting plate salient in the axial direction and a central threaded bore. A central threaded bore concentrically aligned relative to the spindle axis is then correspondingly provided in the adjacent wall of the supporting shell, a restraining screw then being screwed through the central bore to the supporting plate. This design of the membrane spring as well as its fastening to the opposite housing wall allows, given the design of the hub as a hollow member, the second bearing location including the bearing bushing and the membrane spring to be kept so narrow in diameter that this bearing arrangement can be inserted into the hollow member of the hub.

The foregoing, in turn, enables a structure of the disk pack to be assembled easily and, comprising a hub which includes a collar at its end proximate to the first bearing bushing as a seating surface for the outermost of the magnetic disk, whereby the magnetic disk, spaced by shims, are slipped onto the outer surface of the hub. At its other end, the hub comprises a turn-down portion to which a centering projection of a tension ring is inserted, the tension ring being fixed to the associated end face of the hub with fastening screws. This structural embodiment allows a storage disk that may have become faulty to be replaced by means of loosening the tension ring without individual parts of the bearing locations having to be dismantled for that purpose.

According to a particular feature of the invention, the tension ring can be simultaneously employed as a first balancing disk, whereby a second balancing disk can be concentrically fixed to the back end of the spindle that is allocated to the first bearing bushing. A balancing of the disk pack in two planes respectively close to the corresponding bearing location is therefore possible, so that optimum ganging properties of the hub can be managed. Further, this arrangement of the balancing disks is also maintenance and repair friendly. Should a rebalancing after a repair be required for the disk pack, it can prove expedient to replace the used balancing disk with new disk, so that screws employed earlier as weights can not have the distrubing effect of additionally complicating the balancing during the rebalancing process. Moreover, such arrangement of the balancing disks spaced apart from one another in two planes and being accessible from the respective front ends of the disk pack allows for risk-free work when balancing, this being of considerable importance particularly in view of the sensitivity of the surfaces of the storage disks.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Given the magnetic disk memory illustrated, the housing, composed of a supporting shell 1 and of a schematically-indicated cover 2, is cut such that both bearing locations for the magnetic disk pack are disposed in the bottom plate 3 (FIGS. 1 and 2) or, respectively, the cover plate 4 (FIG. 2) of the supporting shell. The essential bearing elements of the housing are therefore united in a single workpiece. This is especially significant for the manufacture, since mutually-allocated bores or, respectively, fitting surfaces in the supporting shell 1, particularly for fashioning the bearing locations, can be produced in one chucking operation and cumulative tolerances are therefore avoided.

Figure 1:
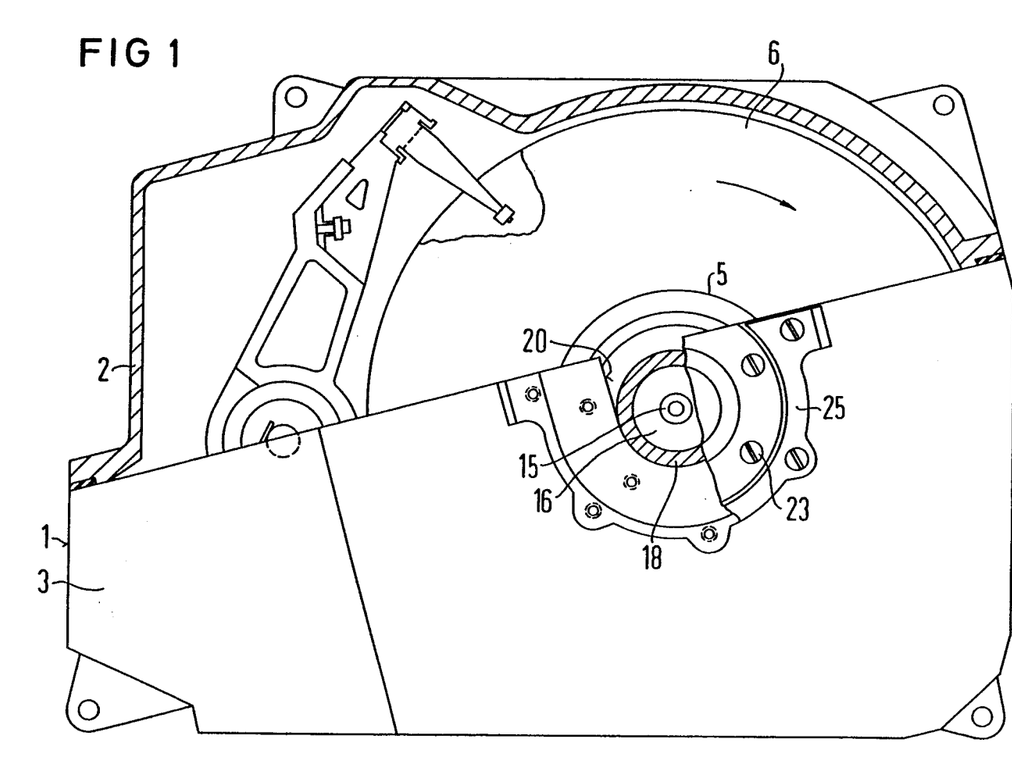
FIG. 1 is a bottom view, partially in section, of a magnetic disk memory constructed in accordance with the present invention.
Figure 2:
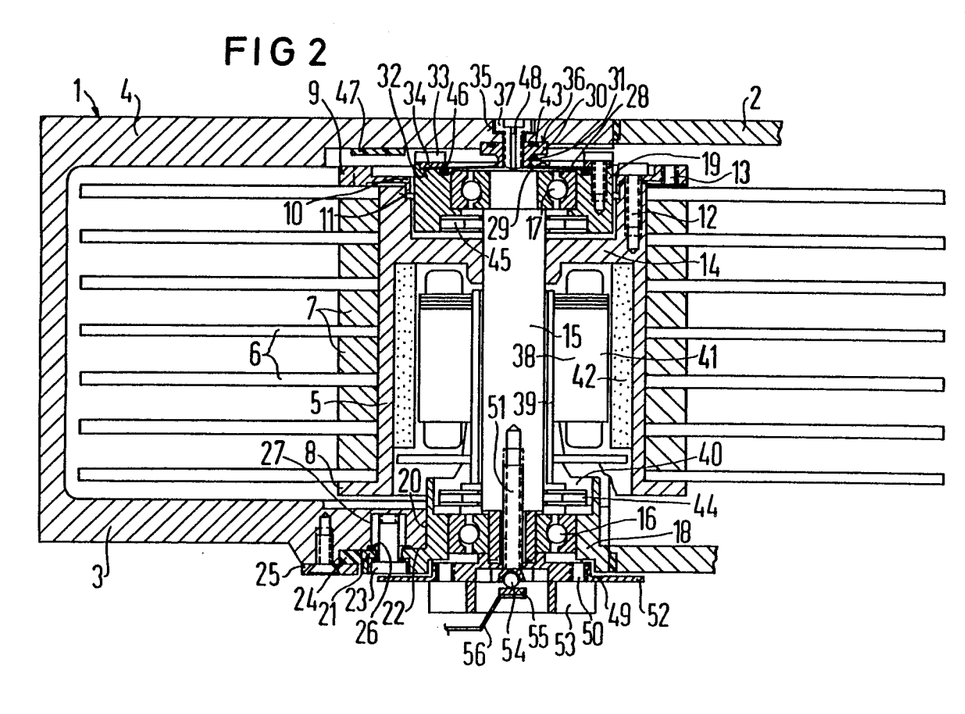
FIG. 2 is a sectional view taken substantially through the axis of rotation of the disk pack, but showing the spindle in full, so that the details of the spindle bearing are clearly illustrated.

A disk pack is seated at both ends in the housing. The disk pack contains a hub 5 that is designed as a hollow member. A plurality of magnetic disks 6 are slipped onto the outer surface of the hub and are maintained at identical spacings via intermediate rings 7. At its lower end, the hub 5 comprises a radially-salient collar 8 which serves as a seating surface for the outermost magnetic disk. A tension ring 9 which comprises a downwardly-projecting shoulder 10 at its inner diameter is provided at the opposite hub end. Allocated to the tension ring, the hub 5 comprises a turndown centering portion 11 into which the shoulder 10 of the tension ring is received and thus centers this end face of the hub. The tension ring is braced to this end face of the hub with fastening screws 12 and thus non positively fixes the storage disk 6 on the hub member.

The tension ring also assumes a second function, for it simultaneously serves as a first balancing disk. To this end, a plurality of threaded bores 13 are concentrically disposed at its outer surface. Small balance weights are screwed into these bores as needed during a balancing operation.

The hub 5 comprises a center web 14 which is fixed with an interference fit to a rotatable spindle 15. The spindle 15 comprises a spindle peg at each end to which the inner rings of ball bearings 16 and 17, respectively, are fixed with an interference fit. The outer rings of the ball bearings, in turn, carry respective first and second bearing bushings 18, 19, again with an interference fit. Both bearing bushings are immobile in the mounted condition of the disk pack.

The first bearing bushing is inserted into a slot 20 let into the bottom plate 3 of the supporting shell 1, the slot 20 comprising a 180° curvature at its inner end. For the purpose of fastening to the bottom plate 3, the first bearing bushing 18 comprises a flange 21 to which a turn-down portion having a bore base 22 let into the bottom plate 23 from the exterior is allocated as a fitting surface. The flange 21 is fixed to the bottom plate 3 from the exterior with further fastening screws 23.

In order to seal the housing interior from the exterior, a sealing ring 24 is provided which, embracing the flange 21 of the first bearing bushing 18, is inserted into the turn-down portion in the bottom plate 3, and is pinched into the bore base 22 of the turn down portion with the assistance of a fastening ring 25 screwed to the exterior of the bottom plate 3. In order to complete the seal, copper washer are inserted as packing rings 26 between the fastening screws 23 and the corresponding sealing surface in the flange 21 of the first bearing bushing 18.

It should be pointed out that the bottom plate 3 must, insofar as allowable, be kept thin in the region of the first bearing bushing for reasons of saving space in the direction of the mounting height. In order to achieve adequate retaining forces for the fastening screws 23 in the first bearing bushing 18 even given a short depth of thread, threaded inserts 27 are inserted into the blind bores in the bottom plate 3 which are allocated to the fastening screws 23.

The second bearing bushing 19 is inserted into the upper cavity of the hub 5 with sufficient play. A membrane spring 28 is fixed to its outwardly directed end face which is proximate to the cover plate 4. This membrane spring can, for example, be made of copper beryllium and, esentially defning the spring characteristic, comprises a thin, round spring plate 29 and a centrally-disposed supporting plate 30 salient in the axial direction. In order to achieve as soft as possible a spring characteristic, the supporting plate is tapered at its lower end connected to the spring plate 29, this being indicated by way of a turned down thinner portion 31.

The spring plate 29 is centered on the facing end of the second bearing bushing with the assistance of a concentric recess 32 in the end face. The spring plate 29 is fixed with further fastening screws 33 which are screwed into the bearing bushing 19 in the axial direction. In order to obtain a clamping that is uniform in the circumferential direction, a thrust collar 34 is inserted between the spring plate 29 and the fastening screws 33.

At the other side, the membrane spring is fixed via its supporting plate 30 to the inside of the cover plate 4 of the supporting shell 1. To this end, a bore 35 is provided in the cover plate 4 concentric to the spindle axis, the bore 35 comprising a large diameter turn-down centering portion 36 at the inside of the cover plate 4. This diameter is selected such that it corresponds to the outer diameter of the supporting plate 30. For fastening, the membrane spring 28 comprises a central threaded bore leading through the supporting plate 30 and receiving a screw 37 inserted into the cover plate 4 from the exterior. When the completely assembled disk pack is inserted into the supporting shell 1, the upper bearing location of the disk pack is fixed to the cover plate 4 only with the screw 37. When this screw is turned in, the head of the supporting plate 30 is drawn into the centering recess 36 and the membrane spring 28 is therefore centered and tensed.

This tensing of the membrane spring, in turn, causes the two ball bearings 16 and 17 to be braced in the position illustrated in FIG. 2, this position being shown exaggerated for reasons of clarity. As a result of the spring power of the tensed membrane spring 28, the second bearing bushing 19 is pulled out in the axial direction, so that the outer ring of the second ball bearing 17 shifts axially relative to the inner ring of the ball bearing. This bearing is therefore tensed in the axial direction and, as a consequence thereof, the spring 15 together with the entire hub 5 and its attached parts are likewise moved axially in the direction towards the cover plate 4. The corresponding axial bracing of the first ball bearing then occurs with this spindle dislocation. For the inner ring of the ball bearing 16 shifts together with the spindle 15, whereas the outer ring is fixed with an interference fit in the fixedly disposed first bearing bushing 18.

A drive motor 38 for the disk pack is disposed in the cavity of the hub 5 between the center web 14 and the first bearing bushing 18. Its stationary stator 39 is slipped over the spindle 17 at an adequate distance and is fitted with an interference fit into the upper end of the first bearing bushing 18 with an annular fastening foot 40. The stator 39 carries a stator winding 41. The power supply to this winding occurs via cables (not shown) which are conducted through an opening which derives from the different diameters of the inner surface of the hub and the outer surface of the first bearing bushing 18. The winding-less rotor 42 of the internal drive motor is formed by permanent magnets which, surrounding the stator winding 41 with a close spacing, are fixed to the inner surface of the hub 5.

It is of extreme importance from the proper operation of the magnetic disk memory that the interior of the housing be kept free of dust. Given, on the one hand, the recording densities that are presently standard and, on the other hand, the extremely exact spatial allocation between the magnetic disks and the magnetic heads (not shown in FIG. 2) which is thereby required, even minute dust particles can produce inadmissible disruptions in operation. It was therefor already pointed out in conjunction with the description of the bearing location in the bottom plate 3 that the sealing surface between the bottom plate 3 and the first bearing bushing is additionally sealed with the seal 24 in conjunction with the sealing washers 26. The opposite bearing location is protected in a similar manner. The head surface of the supporting plate 30 comprises an annular groove into a further packing ring 43 is inserted, this therefore sealing the bore 35 in the cover plate 4.

In addition, however, dirt particles which stem from lubrication and possible abrasion of the ball bearing 16 and 17 must also be prevented from proceeding into the interior of the magnetic disk memory. For this reason, a magnetic fluid seal 44 or, respectively, 45 is provided at the inner ends of the bearing bushings 18, 19 respectively proximate to the ball bearings 16, 17. Such fluid seals are commercially-available accessory parts and therefore require no further explanation here.

The bearing location assigned to the bottom plate is therefore completely partitioned off from the interior of the magnetic disk memory. The fact that the ball bearing 16 communicates with the environment via channels plays no part in this context and is even desirable, as shall be set forth in detail below. The bearing location assigned to the cover plate 4, however, is a different matter. Whereas this bearing location is downwardly covered by the magnetic fluid seal 45, a purely metallic sealing surface between the spring plate 29 and the end face of the second bearing bushing 19 could possibly be inadequate. A concentric annular groove into which a further packing ring 46 is inserted is therefore provided at this end face. The diameter of this annular groove or, respectively, of the inserted packing ring 46 is selected such that the packing ring lies in the region of the thrust collar; an unequivocal sealing surface is therefore achieved between the second bearing bushing 19 and the spring disk 29.

The problem of a dust-free seal of the housing interior is so serious that precautionary measures must usually be undertaken in order to avoid too high a pressure differential between the interior of the magnetic disk memory and the external environment in extreme situations. An air filter 47 disposed in a through bore is schematically indicated in the cover plate. This serves the purpose of producing a pressure compensation so that high pressure differences which could defeat the outwardly-acting seals can never occur.

It should be pointed out here in this context that, although the bearing location allocated to the bottom plate 3, as mentioned, can communicate with the exterior environment, the second ball bearing 16 would be completely partitioned off from the exterior environment insofar as heretofore described. An overpressure building up in the region of this ball bearing could, however, defeat the assigned magnetic fluid seal 45. In order to avoid such a malfunction, this ball bearing is also directly connected to the exterior environment of the magnetic disk memory via an air channel. This channel is produced in that a ventilation bore 48 is provided in the screw 37 which extends through the membrane spring 28.

It has already been explained in conjunction with the structure of the disk pack that the tension ring 9 is designed as a balancing disk at the same time. Accordingly, a second balancing disk 49 is disposed approximate to the first ball bearing 16. The second balancing disk comprises a centering shoulder which is emplaced on the corresponding end peg of the spindle 15 and is therefore coaxially fixed relative to the spindle. This second balancing disk is secured to the spindle peg with the assistance of a further fastening screw 51 that is centrally screwed into the spindle. Threaded bores 50 are again uniformly distributed over the circumference of the disk, balancing weights being optionally screwed into these bores 50 when balancing.

The balancing disk can also be employed for the realization of a further function. During normal operation of the magnetic disk memory, as known, a magnetic head "flies" over the allocated face of the magnetic disk 6 at a very slight distance therefrom on the basis of an air pillow which is formed as a consequence of the high relative speed between the magnetic disk head and the disk surface. As soon as this relative speed decreases, this air pillow threatens to collapse and the magnetic head to land on the disk surface. The risk of damage to the disk surface is thereby extremely high. It must therefore be provided that the range of low relative speeds is very quickly traversed. It is expedient for this reason to provide a mechanical brake which quickly brings the disk pack to a standstill when it runs down. The second balancing disk 49 therefore comprises a broad flange 52 which serves as a disk of a disk brake that is otherwise not shown in detail.

In addition, a ventilator wheel 53 can also be mounted on top of the second balancing disk projecting outwardly, the ventilator wheel 53 serving to cool electronic assemblies (not shown here) which are secured to the bottom plate 3 at the level of the ventilator wheel.

As known, finally, it is desirable to produce a best possible grounding contact for the hub 5 and, thereby, for the entire disk pack. Such a grounding contact can be achieved in that a ball 54 is inserted into the head of the contact screw 51, a carbon lamina 55 being supported against the ball under spring pressure. This carbon lamina, as shown, is connected to a grounding wire 56.

The above-described illustrative embodiment presents a bracing of the bearing of the spindle 15 of the disk pack with the assistance of a membrane spring 28 which is fixed at its circumference to the end face of the second bearing bushing 19 and is screwed via a centrally-disposed supporting plate 30 to the adjacent cover plate 4 of the supporting shell 1. Of course, it is just as conceivable to brace the membrane spring in the opposite direction.

Figure 3:
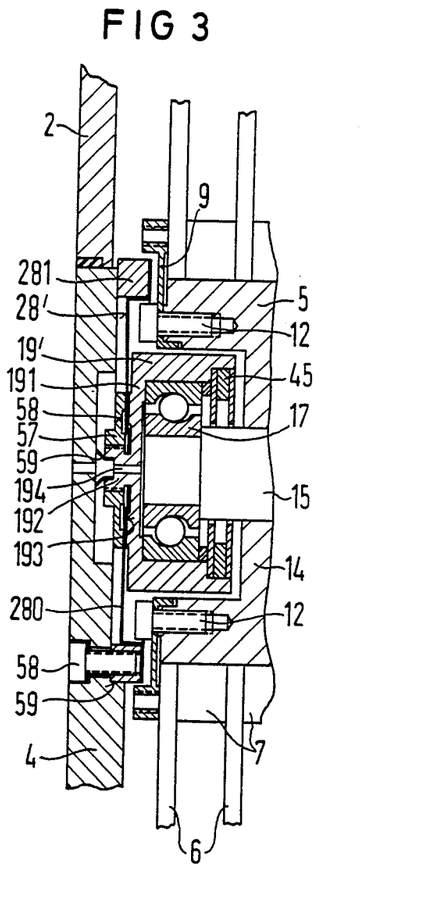
FIG. 3 is a fragmentary sectional view of a further embodiment of the spindle bearing.

As a possible example, FIG. 3 illustrates a further embodiment of this bearing bracing, whereby this figure only illustrates a portion of the structure comprising this bearing location. All other details correspond to the first embodiment and can be directly derived from the sectional view of FIG. 2. All other elements which have been retained unaltered are provided with the same reference characters in FIG. 3, whereas modified component parts are additionally identified with a prime (') in order to respectively produce the relationship between equivalent component parts.

The structure of the disk pack with the hub 5 rigidly seated on the spindle 15 and at which the magnetic disks 6 are disposed and fixed by the tension ring 6 remains unchanged. The second ball bearing likewise continues to be seated with an interference fit on an end peg of the spindle 15. The shape of the second bearing bushing 19' slipped over the outer ring of the bearing 17 is adapted to the modified function, but again carries the magnetic fluid seal 45 proximate to the ball bearing 17.

In contrast to the first embodiment, this bearing bushing, however, is now designed as a hollow member which surrounds the second ball bearing 17 on three sides. The end wall 191 of the bearing bushing 19 is shaped such that, proceeding from the inside, the bearing can be inserted up to the base of the bore of the bearing bushing. The outside of this end wall is designed as a seating surface for the membrane spring 28'. In this embodiment, the membrane spring is now centrally secured to the bearing bushing 19'. To this end, the end wall 191 comprises an outwardly-projecting threaded stem 192 centrally aligned with the spindle axis and having a central bore 194. Moreover, a salient, concentric stud ring 193 is provided at the outside of the end wall 191, the ring forming the seating surface for the spring plate 280 of the membrane spring 28'. A tension nut 57 is screwed on the threaded stem 192 of the second bearing bushing 19'. It comprises a turn-down portion at that side facing the bearing bushing 19'; therewith achieved is that the circumference of the tension nut 57 unequivocally, non-positively fixed the spring plate 280 of the membrane spring 28' to the stud ring 193 of the second bearing bushing 19'. On the other hand, the circumference of the membrane spring 28' must not be fixed to the inside of the cover plate 4. In modification of the first embodiment of the membrane spring, a fastening ring 281 is provided and is firmly connected to the resilient central portion, i.e. to the spring plate 280.

Such a membrane spring can be manufactured in a variety of ways. One possibility consists of manufacturing the membrane spring from a piece of copper beryllium, for example as a turned part. In this case, the membrane spring 28' is a one-piece resilient element. However, the fastening ring 281 and the spring plate 280 can also be two discrete parts. As indicated in FIG.

3, it is expedient in this case to crimp the spring plate 280 and its outside circumference, to slip the fastening ring 281 unto the edge and to fix it there by know methods such as, for example, hard soldering, welding or bonding.

The fastening ring 281 carries threaded bores distributed over its circumference into which further screws 58 extending through allocated bores and the cover plate 4 are received. The fastening ring 281 is thereby centered in a turn-down portion 59 let into the inner wall of the cover plate 4.

Finally, it should also be pointed out that the second ball bearing directly communicates with the exterior environment through a pressure compensation channel given this embodiment as well. This is achieved by the provision of a central bore in the cover plate 4 in communication with the central bore 194. Moreover, the inside of the second bearing bushing 19' comprises a slight turn-down portion which forms a part of this air channel. This air channel, however, must be hermetically sealed relative to the interior of the magnetic disk memory. A funnel-shaped seal 59 is therefore inserted into the end face of the tension nut 57, the edge of the seal 59 pressing against the inner surface of the cover plate 4 in a sealing fashion when the membrane spring 28' is tensed.

The above-described illustrative embodiments disclose a two-sided bearing for the hub of a magnetic disk pack in the one-piece supporting shell in which a membrane spring is disposed between the one bearing location and the adjacent housing wall and exerts the bracing force required in order to tense the ball bearings to be free of play in the axial direction. The two illustrative embodiments show two forms of disposition of such a membrane spring and are intended to elucidate the fundamental possibilities for the realization of this bracing function. Although we have described our invention by reference to particular embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A magnetic disk memory comprising:
   a housing comprising a one-piece support shell including first and second parallel spaced apart walls;
   a disk pack including a spindle perpendicular to said walls and having first and second ends, first and second ball bearings each including an inner ring fixedly mounted on a respective spindle end and an outer ring, first and second bearing bushings respectively mounted on said outer rings, said first bearing bushing connected to said first wall, a hollow hub about and connected to said spindle for mutual rotation therewith, said hub comprising a hollow tube and a web in said tube secured to said spindle, a drive motor in said hollow tube including a stator connected to said first bearing bushing and a rotor fixed to the inner surface of said hollow tube, and at least one magnetic disk carried on the exterior of said hub; and
   pre-stressing means connecting said second bearing bushing to said second wall and effective to draw said bearing bushings in opposite directions towards the respective shell walls and suppress axial play of said bearings.

2. The magnetic disk memory of claim 1, wherein:
   said prestressing means comprises a membrane spring disposed coaxially with respect to the axis of said spindle and fixed to said second bearing bushing and adjustably axially fixed to said second wall for tensioning said bearings in the axial direction.

3. The magnetic disk memory of claim 2, wherein:
   said membrane spring comprises a spring plate connected to said second bushing, and a fastening ring encompassing said spring plate and connected to said second wall.

4. The magnetic disk memory of claim 2, wherein:
   said membrane spring comprises a spring plate having its periphery connected to said second bushing and its center connected to said second wall.

5. The magnetic disk memory of claim 4, wherein:
   said membrane spring comprises a centrally-disposed support plate projecting axially from said spring plate and a central threaded bore; and
   said second wall comprises a central bore and a tensioning screw extending through said bore and threadedly engaging said threaded bore.

6. The magnetic disk memory of claim 5, wherein:
   said membrane spring comprises copper beryllium and includes a thin portion on said support plate to obtain a flat spring characteristic.

7. The magnetic disk memory of claim 5,
   wherein said central bore includes a recessed centering portion dimensioned to receive said support plate when said membrane spring is tensed.

8. The magnetic disk memory of claim 7, wherein:
   said second bearing bushing comprises a recess concentric to the axis of said spindle receiving said spring plate therein;
   and further comprising a thrust collar over the periphery of said spring plate and screws connecting said thrust collar to said second bearing bushing.

9. The magnetic disk memory of claim 8, and further comprising:
   a first annular groove in said second bearing bushing facing said spring plate and a second annular groove in said support plate facing said centering recessed portion;
   a second packing ring in said second annular groove.

10. The magnetic disk memory of claim 9, wherein:
    said tensioning screw indluces an axial passageway communicating from the exterior through said membrane spring to form a pressure compensation channel.

11. The magnetic disk memory of claim 1, and further comprising:
    first and second magnetic fluid seals respectively mounted to said bearing bushings on the sides facing the interior of said hub.

12. The magnetic disk memory of claim 1, wherein:
    said first wall comprises first bearing mounting means for mounting said first ball bearing including a slot having a 180° curved end for receiving said first bearing bushing.

13. The magnetic disk memory of claim 12, wherein:
    said first wall further comprises a recess about the 180° curvature of the slot; and
    said first bearing bushing comprises a flange received in said recess.

14. The magnetic disk memory of claim 13, wherein:

said flange comprises a plurality of circumferentially-spaced bores; and said first wall comprises a corresponding plurality of threaded bores aligned with said circumferentially spaced bores for receiving fastening screws.

15. The magnetic disk memory of claim 1, wherein:

said at least one magnetic disk comprises a plurality of magnetic disks spaced apart by intervening spacers;

said hub comprises a collar projecting radially therefrom as a seat for the lowermost disk of said disk pack; and a tension ring is provided at the opposite end of said disk pack including a shoulder received in said hub and screws connecting said tension ring to said hub to clamp said disks and spacers.

16. The magnetic disk memory of claim 15, wherein:

said tension ring comprises a plurality of circumferentially spaced bores for selectively receiving balancing weights.

17. The magnetic disk memory of claim 16, wherein:

the inner diameters of said tension ring and said hub are greater than the outer diameter of said second bearing bushing so that said disk pack can be taken apart by releasing said tension ring without removing said bearings.

18. The magnetic disk memory of claim 16, and further comprising:

a further balancing disk concentrically fixed to said spindle adjacent said first bearing bushing.

19. The magnetic disk memory of claim 18, wherein:

said further balancing disk comprises a concentrically-disposed collar disposed over the respective spindle end; and a centrally-disposed screw connecting said further balancing disk to said spindle.

20. The magnetic disk of claim 19, wherein:

brake means are provided including said collar of said further balancing disk as a brake disk.

21. The magnetic disk of claim 19, and further comprising:

a ventilator wheel carried on said further balancing disk.

22. The magnetic disk of claim 19, wherein:

said centrally-disposed screw comprises a head;

a grounded spring-loaded carbon lamina contacts said head.

23. The magnetic disk of claim 22, wherein:

said head comprises a concave surface; and a conductive sphere is disposed in said concave surface contacting said lamina.

* * * * *

UNITED STATES PATENT AND TRADEMARK OFFICE
CERTIFICATE OF CORRECTION

PATENT NO. : 4,739,425
DATED : April 19, 1988
INVENTOR(S) : Albert Dierkes, et al application It is certified that error appears in the above—identified patent and that said Letters Patent is hereby corrected as shown below:

On the Title Page

Item [21] should read --[21] Appl. No. : 696,207--

Signed and Sealed this

Twenty-seventh Day of September, 1988

*Attest:*

DONALD J. QUIGG

*Attesting Officer*      *Commissioner of Patents and Trademarks*